United States Patent [19]
Spencer et al.

[11] Patent Number: 5,519,462
[45] Date of Patent: May 21, 1996

[54] DUAL FUNCTION MAGNETIC DATA READ CIRCUIT FOR PHOTOGRAPHIC EQUIPMENT

[75] Inventors: Paul E. Spencer, Livonia; J. David Cocca, Pittsford, both of N.Y.

[73] Assignee: Eastman Kodak Company, Rochester, N.Y.

[21] Appl. No.: 278,298

[22] Filed: Jul. 21, 1994

[51] Int. Cl.$^6$ .............................. G03B 7/00; G03B 7/24
[52] U.S. Cl. ............................................... 354/21; 354/106
[58] Field of Search ................................ 360/3; 354/21, 354/76, 105, 106

[56] References Cited

U.S. PATENT DOCUMENTS

| | | | |
|---|---|---|---|
| 4,173,401 | 11/1979 | Harvey | 354/21 |
| 4,693,574 | 9/1987 | Ohnuki et al. | 354/21 |
| 5,398,087 | 3/1995 | Kazami et al. | 354/21 |

Primary Examiner—Michael L. Gellner
Assistant Examiner—Michael Dalakis
Attorney, Agent, or Firm—Francis H. Boos, Jr.

[57] ABSTRACT

A dual function read data circuit for a mid-roll interrupt capable photographic camera reads magnetically recorded data from a magnetic layer on photographic film and outputs either a data present signal or an actual converted data signal in response to a mode select command signal.

4 Claims, 2 Drawing Sheets

5,519,462

DUAL FUNCTION MAGNETIC DATA READ CIRCUIT FOR PHOTOGRAPHIC EQUIPMENT

FIELD OF THE INVENTION

This invention relates generally to photographic equipment that includes a magnetic recording medium, and more particularly to circuitry responsive to signals recorded on the magnetic recording medium.

BACKGROUND OF THE INVENTION

Data communication between different stages of film use and processing (e.g. a camera user and dealer or photofinisher) has traditionally required separate written forms. This has not proven to be a very convenient or efficient method of relaying important information from one stage to another.

An innovation in data communication for motion picture film was introduced as described in the publication "DATAKODE Magnetic Control Surface" by Eastman Kodak Company 1983 (Publication No. V3-517). A thin layer of magnetic oxide was coated across the entire back surface of a roll of motion picture film to provide the capability to magnetically record digital data on the film without interfering with normal photographic use of the film. This permitted recording of different types of digital data at different stages of production of a motion picture which allowed for information exchange such as camera, lighting and filter data at the time of shooting to printer exposure control information in the laboratory to theater automation control signals during exhibition.

More recently, it has been proposed to employ a virtually transparent magnetic layer on still photography filmstrip to allow for magnetic recording of data in one or more longitudinal tracks associated with individual film image frames for information exchange purposes. An example of such a system is described in commonly assigned U.S. Pat. No. 4,965,627 issued Oct. 23, 1990. In order to provide quick access to particular data at any stage of film use, related data is preferably grouped and recorded in specific predetermined tracks. Camera data is recorded in several dedicated longitudinal tracks located along the filmstrip edges. The data is preferably recorded in pulse position encoded form in order to be independent of film transport velocity.

There has also been proposed, recently, camera systems that allow for removal of a film roll before all available film frames have been exposed, and later insertion in the same or different camera for exposure of the remaining film frames without double exposure of the previously exposed frames. This feature is generally referred to as "Mid-Roll Interrupt". While a number of arrangements have been proposed for implementing this feature, one that is generally accepted involves detecting the existence of magnetically recorded data adjacent exposed frames during loading of the film into the camera to position the film at the next available unexposed frame as indicated by the absence of recorded data. In less expensive MRI-equipped cameras it is necessary only to detect the existence of recorded data without decoding the detected data to implement the MRI function. In more sophisticated cameras, it may also be required that the data be decoded for transfer of operating control information to the camera controller while at the same time serving as an indicator of exposed frame positions.

For cost reasons it is desirable to have available integrated circuit chips that are capable of use in a multiplicity of camera designs, e.g. both the lower cost and more sophisticated cameras. Additionally, it is important to recognize that the magnetic layer employed as a virtually transparent layer on photographic film results in extremely small signal levels produced by the size constrained multi-turn inductive read heads that are usable in modern small camera designs. It is important that the MRI feature be able to discern proper signals from "background noise" in the camera system particularly since it is important that the MRI implementation be able to notify the camera system with a high degree of probability that a film frame has previously written magnetic data on it.

SUMMARY OF THE INVENTION

The foregoing requirements are realized, in accordance with the principles of the present invention, by means of a dual function magnetic data read circuit for photographic equipment comprising means for supplying a magnetic head read data signal from data magnetically recorded on a magnetic layer formed on photographic film; signal conversion means responsive to the read data signal for generating a converted data signal therefrom; a pulse counter for generating a data present signal in response to a predetermined number of pulses in the converted data signal; a data mode command signal supply; and mode selection means responsive to the data mode command signal supply for selecting and outputting the converted data signal when the command signal is a first value and the data present signal when the mode command signal is a second value.

DETAILED DESCRIPTION OF THE INVENTION

Figure 1:
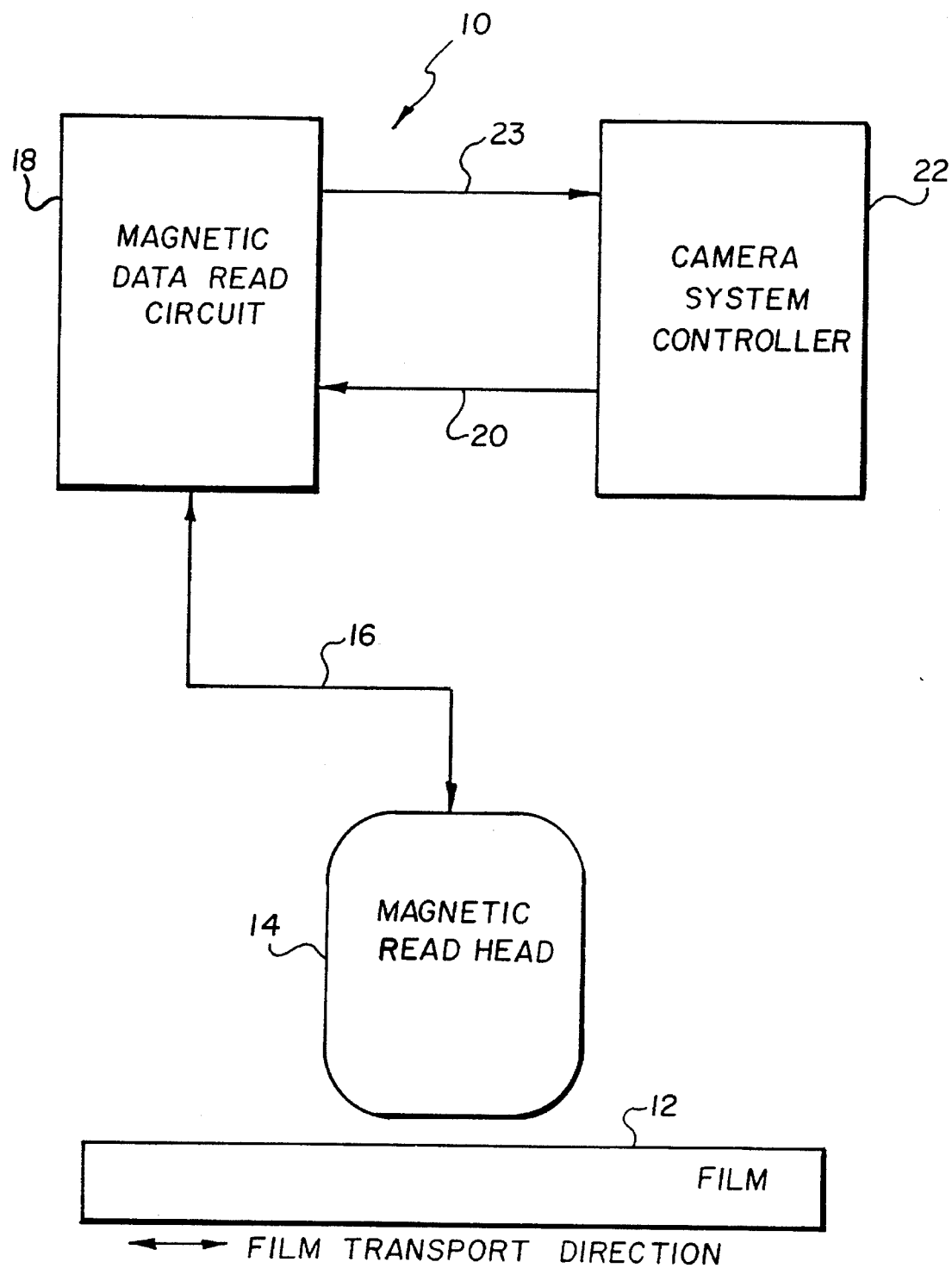
FIG. 1 is a functional block diagram of a photographic equipment using a magnetic head and a magnetic data read circuit to sense information from a photographic film that has magnetic recording capacity.

FIG. 1 depicts a generic function block diagram for photographic equipment 10 which includes a photographic film 12 with magnetic recording capability positioned adjacent to a magnetic read head 14. When photographic film 12 is moved in a forward or reverse direction by a film transport (not shown), magnetic information on photographic film 12 is sensed by magnetic read head 14, which outputs a magnetic head read signal on line 16. A magnetic data read circuit 18 receives the magnetic head read signal on line 16 and an external command input on line 20 from a camera system controller 22. Magnetic data read circuit 18 performs a detection process according to the external command input on line 20 and outputs a suitable data signal on line 23 to the camera system controller 22. The camera system controller 22 operates to control the functional operation of the photographic equipment 10 in various operating functions including the MRI function of detecting the presence of partially exposed film and positioning the film to the next available unexposed film frame.

Figure 2:
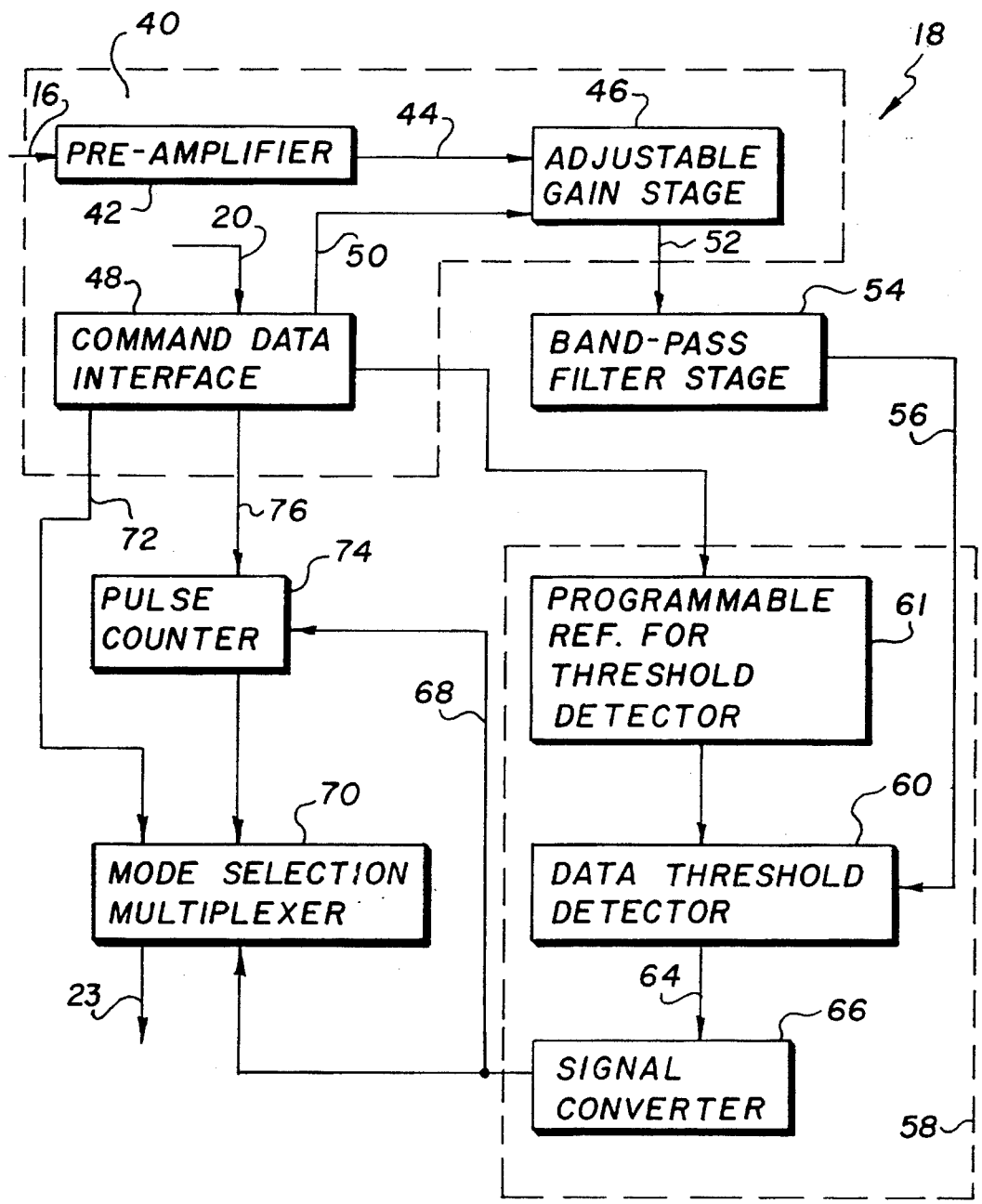
FIG. 2 shows a functional block diagram of the magnetic data read circuit of FIG. 1 in accordance with the present invention.

FIG. 2 provides more detail for implementation of the magnetic data read circuit 18 for this invention. Magnetic data read circuit 18 comprises an amplifier control section 40 which includes a preamplifier 42, an adjustable gain stage 46 and a command data interface 48. One implementation of preamplifier 42 would be a low noise CMOS differential preamplifier. The magnetic head read data signal supplied on line 16 is initially received by preamplifier 42, which amplifies the magnetic head read data signal and outputs a gain input signal on line 44 to adjustable gain stage 46. An external command input on line 20 is received and stored by command data interface 48, which subsequently generates a gain control command signal on line 50. Adjustable gain stage 46 processes gain input signal on line 44 according to gain control command 50, and outputs a filter input signal on line 52 to band-pass filter stage 54. One implementation of an adjustable gain stage 46 would be a matched network of feedback resistors which can be selectively connected to an amplifier that is part of adjustable gain stage 46.

Bandpass filter stage 54 removes noise from filter input signal 52 and then generates a threshold detector input signal on line 56. One implementation of bandpass filter stage 54 would be a continuous time anti-aliasing low pass filter followed by a switched capacitive low pass filter and a switched capacitive high pass filter. Other filter design implementations could readily be generated by one skilled in the art.

In accordance with a particular feature of the invention, signal conversion section 58 includes a data threshold detector 60, a programmable reference 61 and a signal converter 66. A threshold detector reference command 62 from command data interface 48 is applied to programmable reference 61 to establish a reference threshold for threshold detector 60 to process threshold detector input signal 56 according to the programmable reference to generate threshold detected output signals on line 64. Signal converter 66 operates on the threshold output signals to generate converted data signals on line 68 applied simultaneously to pulse counter circuit 74 and mode selection multiplexer 70. Pulse counter 74 measures the signal converter output 68 by counting the number of pulses in the converted data signal and, when the pulse count reaches a predetermined value determined by a supplied pulse count command signal on line 76 generated by command data interface 48, generates a data present signal on line 78 when the number of pulses in a given time equals or exceeds a predetermined count set by the command signal on line 76.

A mode selection multiplexer 70 has two output signal operating modes which are chosen according to a mode select command on line 72 from command data interface 48. In a first mode, when the command signal on line 72 is a first value, the converted data signal on line 68 is outputted directly from signal conversion section 58 by mode selection multiplexer 70 via line 23 to the camera system controller. In a second mode, when the command signal on line 72 is a second value as set by interface 48, the data present/absent signal at the output of pulse counter 74 is outputted to the camera controller 22. Thus, by virtue of a simple mechanism in the magnetic data read circuit 18, the circuit is made capable of outputting either a data present signal or actual converted data thereby providing the flexibility and universal capability desirable for a wide variety of MRI capable camera designs.

PARTS LIST:

| | |
|---|---|
| 10 | photographic equipment |
| 12 | film |
| 14 | magnetic read head |
| 18 | magnetic data read circuit |

PARTS LIST:

| | |
|---|---|
| 22 | camera system controller |
| 40 | amplifier control section |
| 42 | preamplifier |
| 46 | adjustable gain stage |
| 48 | command data interface |
| 54 | bandpass filter stage |
| 58 | signal conversion section |
| 60 | data threshold detector |
| 66 | signal converter |
| 70 | mode selection multiplexer |
| 74 | pulse counter |

What is claimed is:

1. A dual function magnetic data read circuit for photographic equipment comprising:

means for supplying a magnetic head read data signal from data magnetically recorded on a magnetic layer formed on photographic film;

signal conversion means responsive to the read data signal for generating a converted data signal therefrom;

a pulse counter for generating a data present signal in response to a predetermined number of pulses in the converted data signal;

a data mode command signal supply; and mode selection means responsive to said data mode command signal supply for selecting and outputting said converted data signal when the command signal is a first value and the data present signal when the mode command signal is a second value.

2. The dual function magnetic data read circuit of claim 1 wherein said signal conversion means includes:

a programmable reference threshold detector and a signal converter for deriving a binary signal output from the read data signal.

3. The dual function magnetic data read circuit of claim 1 wherein said pulse counter counts pulses in said converted signal and is responsive to a supplied pulse count command signal to generate a data present signal when the pulse count reaches a predetermined value established by said supplied pulse count command signal.

4. A dual function magnetic data read circuit for photographic equipment comprising:

signal conversion means that includes a threshold detector with a threshold level set by an external command such that said threshold detector receives an input signal and generates a first group of command signals, and said signal conversion means further includes a signal converter that receives said first group of command signals and outputs a converted signal;

a pulse counter for counting the number of pulses in said converted signal and generating a data condition output signal which changes from data absent to data present in response to predetermined pulse count set by a supplied pulse count command signal; and mode selection means for selecting an operation mode in response to a supplied mode command signal wherein a first operation mode outputs said converted signal when said mode command signal has a first value, and a second operation mode outputs said data condition output signal when said mode command signal has a second value.

* * * * *